United States Patent
Fluch et al.

(10) Patent No.: US 12,291,658 B2
(45) Date of Patent: May 6, 2025

(54) ELECTRICAL STEEL STRIP OR SHEET, METHOD FOR PRODUCING SUCH AN ELECTRICAL STEEL STRIP OR SHEET, AND LAMINATION STACK MADE THEREFROM

(71) Applicant: voestalpine Stahl GmbH, Linz (AT)

(72) Inventors: Ronald Fluch, Linz (AT); Timothy Keppert, Linz (AT)

(73) Assignee: voestalpine Stahl GmbH, Linz (AT)

( * ) Notice: Subject to any disclaimer, the term of this patent is extended or adjusted under 35 U.S.C. 154(b) by 983 days.

(21) Appl. No.: 17/056,709

(22) PCT Filed: May 20, 2019

(86) PCT No.: PCT/EP2019/063010
§ 371 (c)(1),
(2) Date: Nov. 18, 2020

(87) PCT Pub. No.: WO2019/219983
PCT Pub. Date: Nov. 21, 2019

(65) Prior Publication Data
US 2021/0309894 A1  Oct. 7, 2021

(30) Foreign Application Priority Data
May 18, 2018 (EP) ..................... 18173378

(51) Int. Cl.
| | |
|---|---|
| *C09J 163/00* | (2006.01) |
| *B32B 7/12* | (2006.01) |
| *B32B 15/01* | (2006.01) |
| *B32B 37/12* | (2006.01) |
| *C09J 7/28* | (2018.01) |
| *C09J 7/35* | (2018.01) |
| *H01F 1/18* | (2006.01) |

(52) U.S. Cl.
CPC .............. *C09J 163/00* (2013.01); *B32B 7/12* (2013.01); *B32B 15/011* (2013.01); *B32B 37/1207* (2013.01); *C09J 7/28* (2018.01); *C09J 7/35* (2018.01); *H01F 1/18* (2013.01); *B32B 2037/1215* (2013.01); *C09J 2301/304* (2020.08); *C09J 2463/00* (2013.01)

(58) Field of Classification Search
CPC ...... C09J 163/00; C09J 7/28; C09J 7/35; C09J 2301/304; C09J 2463/00; B32B 7/12; H01F 1/18
See application file for complete search history.

(56) References Cited

U.S. PATENT DOCUMENTS

| | | | |
|---|---|---|---|
| 2011/0217512 A1 * | 9/2011 | Heishi | H05K 3/4661 428/141 |
| 2014/0348776 A1 * | 11/2014 | Palmer, Jr. | C08K 3/20 428/35.8 |

FOREIGN PATENT DOCUMENTS

| | | | | |
|---|---|---|---|---|
| EP | 2180012 A1 * | 4/2010 | | C08G 59/4014 |
| WO | WO-2006049935 A1 * | 5/2006 | | C08L 63/00 |
| WO | 2012059588 A1 | 5/2012 | | |
| WO | 2014089593 A1 | 6/2014 | | |
| WO | 2016151129 A1 | 9/2016 | | |

OTHER PUBLICATIONS

Hunstman, "Jeffamine Polyetheramine". Online. Accessed Dec. 29, 2023. chrome-extension://efaidnbmnnnibpcajpcglclefindmkaj/https://www.huntsman.com/docs/Documents/JEFFAMINE%C2%AE%20Polyetheramines%20Formulation%20Guide.pdf (Year: 2023).*

* cited by examiner

*Primary Examiner* — Callie E Shosho
*Assistant Examiner* — Bethany M Miller

(57) ABSTRACT

An electrical steel strip or sheet with at least one thermo-hardenable, water-based hot-melt adhesive varnish layer provided on one of its flat sides, a method for producing such an electric steel strip or sheet, and a lamination stack made therefrom are disclosed. In order to be able to have an increased melt viscosity during the baking process, it is proposed that the thermo-hardenable, water-based hot-melt adhesive varnish layer also have a pre-cross-linking agent that bonds with the epoxy resin or with a mixture of epoxy resins, the pre-cross-linking agent being an organic amine with three amino groups, namely an organic triamine or a mixture of such organic amines.

21 Claims, 1 Drawing Sheet

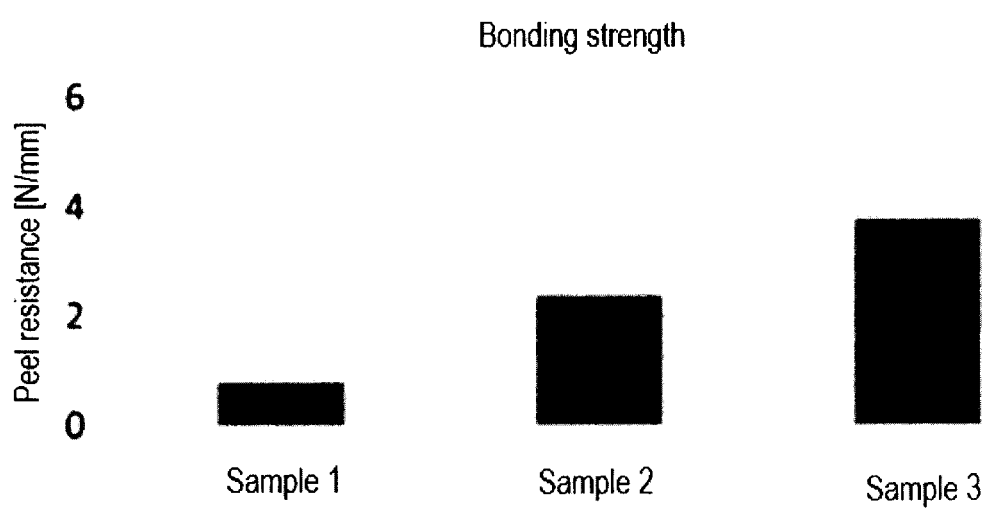

ELECTRICAL STEEL STRIP OR SHEET, METHOD FOR PRODUCING SUCH AN ELECTRICAL STEEL STRIP OR SHEET, AND LAMINATION STACK MADE THEREFROM

FIELD OF THE INVENTION

The invention relates to an electrical steel strip or sheet with at least one thermo-hardenable water-based hot-melt adhesive varnish layer provided on one of its flat sides, a method for producing such an electrical steel strip or sheet, and a lamination stack made therefrom.

DESCRIPTION OF THE PRIOR ART

Numerous methods are known from the prior art for adhesive-coating the surface of an electric steel strip or sheet in order to enable sheet metal parts cut therefrom to be glued to form a lamination stack. For example, electric steel strips or sheets are coated with a thermo-hardenable hot-melt adhesive varnish, in other words, a reactive adhesive system with hot-melt adhesive—also referred to as baked varnish (WO 2014/089593 A1). After the drying, i.e. the removal of solvents from the thermo-hardenable hot-melt adhesive varnish layer, the cut sheet metal parts composed of such a coated electric steel strip or sheet are stacked on top of one another and by means of a so-called baking process, are first made to adhere and then to harden—in other words, are integrally bonded to one another to form stacks using the parameters of pressure, temperature, and time.

Obtaining high-strength lamination stacks with outstanding magnetic properties is a matter of adjusting the adhesiveness or adhesive state of the hot-melt adhesive varnish as constantly as possible and keeping them as stable as possible—namely from before its application to the electric steel strip or sheet, to the drying, and to the final hardening, i.e. until the start of the baking process. From a process standpoint, if nothing else, the integral bonding turns out to be problematic since in this connection, it is of critical importance to prevent a leakage of baked varnish during the baking process.

SUMMARY OF THE INVENTION

The object of the invention, therefore, is to provide, based on the prior art described at the beginning, an electric steel strip or sheet with at least one thermo-hardenable, water-based hot-melt adhesive varnish layer provided on one of its flat sides, which has an increased melt viscosity during the baking process.

If the thermo-hardenable, water-based hot-melt adhesive varnish layer also has a pre-cross-linking agent that bonds with the epoxy resin or with the mixture of epoxy resins, in particular already at room temperature, the pre-cross-linking agent being an organic amine with three amino groups, namely an organic triamine or a mixture of such organic amines, then a particular state of the hot-melt adhesive varnish layer can be adjusted. An organic triamine is understood to be an organic compound with exactly three amino groups. This is also true particularly for organic amines, namely organic triamines, which have three primary amino groups. A pre-cross-linking with the aid of such organic amines, i.e. the reaction of the amino groups with reactive epoxy groups of different epoxy resin molecules of the epoxy resin to form secondary and/or tertiary amines, produces comparatively voluminous compounds in the thermo-hardenable, water-based hot-melt adhesive varnish layer. This pre-cross-linking according to the invention can be adjusted with the aid of organic amines with three amino groups, namely with the aid of organic triamines, in such a way that the melt viscosity of the thermo-hardenable hot-melt adhesive varnish layer is increased—and it is thus possible to prevent a leakage of the hot-melt adhesive varnish during an integral bonding, for example of sheet metal parts to form a lamination stack in the course of a baking process. But this must be achieved without negatively affecting the adhesiveness of the hot-melt adhesive varnish layer or its adhesive strength relative to the electric steel strip or sheet. It is also possible to ensure the stability of the dispersion of the water-based hot-melt adhesive varnish during its storage at room temperature as well as during its further use, i.e. application to the electric steel strip or sheet and/or subsequent drying of the applied hot-melt adhesive varnish layer, etc.

An organic triamine can be particularly suitable as a pre-cross-linking agent since such an agent forms comparatively stable pre-cross-linking bonds with a sufficient degree of cross-linking.

Organic triamines also excel due to their water solubility and comparatively low toxicity—and thus ease of use. In addition, they exhibit a particularly low odor nuisance.

A simplification in the adjustment of the ingredient proportions of the epoxy resin or mixture of epoxy resins and the pre-cross-linking agent can be achieved if the three amino groups of the pre-cross-linking agent are each primary amino groups. It is therefore possible to specifically presume an essentially uniform reactivity of the amino groups of the pre-cross-linking agent, which facilitates the adjustment of the state of the hot-melt adhesive varnish layer for the desired properties thereof on the electric steel strip or sheet.

It can also turn out to be particularly advantageous if the percentage by weight of the pre-cross-linking agent and the epoxy resin or mixture of epoxy resins in the water-based, thermo-hardenable hot-melt adhesive varnish layer satisfy the following relation:

$$\text{Percentage by weight of pre-cross-linking agent} = \frac{\text{Percentage by weight of the epoxy resin or mixture of epoxy resins}}{\text{average } M \text{ of the epoxy resin or mixture of epoxy resins}} * \frac{\text{average } M \text{ of the pre-cross-linking agent}}{X * \text{average number of amino groups of the pre-cross-linking agent molecules}}$$

where X stands for a number from 1.6 to 28.9, in particular 2.1 to 19.4, in particular 2.9 to 7.2, and M stands for molar mass.

It can be presumed that at least the majority of the primary amino groups of the pre-cross-linking agent respectively bond with different epoxy resin molecules to form secondary or predominantly tertiary amines. The formation of polymers in this way results in an increase in molar mass—this ratio of amino groups and epoxy groups according to the invention is ideal for achieving a degree of pre-cross-linking that is ample enough to not cause any gelling of the water-based hot-melt adhesive varnish layer.

This therefore does not jeopardize the stability of the dispersion at room temperature. This effect, which indicates a long-term storage stability at room temperature, has been achievable to a surprisingly high degree—which in turn can mean a very easy use of the hot-melt adhesive varnish when applying the hot-melt adhesive varnish layer and during a subsequent drying on the electric steel strip or sheet as well as advantageous properties such as an increased drying speed of the hot-melt adhesive varnish layer on the electric steel strip or sheet together with a high level of hardness while simultaneously having a very good elasticity.

The invention can also particularly excel primarily with regard to the further use of the electric steel strip or sheet that is coated in this way. The melt viscosity of the hot-melt adhesive varnish on the electric steel strip or sheet can be influenced, in particular increased, with the aid of the pre-cross-linking agent—which makes it possible to reduce the risk of leakage in the baking process of coated electric steel strips or sheets that are to be integrally bonded as well as sheet metal parts that are made therefrom. This is possible with the aid of the relation according to the invention of the percentage by weight of the pre-cross-linking agent and the epoxy resin or mixture of epoxy resins in the water-based, thermo-hardenable hot-melt adhesive varnish layer—to a surprising degree since it is not necessary to accept any disadvantageous influence with regard to the stability and dispersion and with regard to the use of the hot-melt adhesive varnish, e.g. in the application of the hot-melt adhesive varnish layer. In this way, it is therefore possible among other things to obtain high-strength lamination stacks with outstanding magnetic properties.

With regard to the comparatively stable pre-cross-linkings with a sufficient degree of cross-linking, a polyether tri-amine, preferably a polyoxypropylene triamine, turns out to be particularly suitable as a pre-cross-linking agent; these are not only inexpensive, but can also feature good elasticity of a dried and hardened hot-melt adhesive varnish layer. Polyether triamine, preferably a polyoxypropylene triamine, as the pre-cross-linking agent is also characterized by its water solubility and comparatively low toxicity—thus ease of use. In addition, they feature a particularly low odor nuisance.

If an amino group of the polyether triamine is bonded to secondary carbon atoms of terminal ether groups, then it is possible to achieve a steric hindrance at the carbon that carries the amino group—which makes it advantageously possible to adjust the reactivity and the degree of cross-linking and thus the volume of the compound composed of the pre-cross-linking agent and the epoxy resin. This is also true if all of the amino groups of the polyether triamine are bonded to secondary carbon atoms of terminal ether groups.

If the epoxy resin or the mixture of epoxy resins is bisphenol A-based, then it is possible to obtain a particularly inexpensive hot-melt adhesive varnish layer.

A simple production and further use of the thermo-hardenable hot-melt adhesive varnish layer can be achieved if this thermo-hardenable hot-melt adhesive varnish layer has a cyanamide-based hardener that is latent at room temperature, in particular consisting of dicyandiamide.

The above-mentioned advantages are particularly achievable if the thermo-hardenable, water-based hot-melt adhesive varnish layer contains 35 to 55% by weight, in particular 40 to 50% by weight, of an epoxy resin or mixture of epoxy resins with an average molar mass of 1500 to 2000 g/mol and 0.1 to 2% by weight, in particular 0.2 to 1.0% by weight, of triamine as a pre-cross-linking agent with an average molar mass of 350 to 550 g/mol.

It can also turn out to be advantageous if the thermo-hardenable, water-based hot-melt adhesive varnish layer contains 2 to 10% by weight, in particular 3 to 8% by weight, of a latent cyanamide-based hardener, in particular dicyandiamide.

Preferably, the thermo-hardenable, water-based hot-melt adhesive varnish layer can contain a remainder of water and in particular 4 to 20% by weight of a cosolvent, preferably 1-methoxy-propanol as the cosolvent.

The above-mentioned advantages are particularly achievable if the thermo-hardenable, water-based hot-melt adhesive varnish layer contains 35 to 55% by weight, in particular 40 to 50% by weight, of an epoxy resin or mixture of epoxy resins with an average molar mass of 1500 to 2000 g/mol and 0.1 to 2% by weight, in particular 0.2 to 1.0% by weight, of triamine as a pre-cross-linking agent with an average molar mass of 350 to 550 g/mol, 2 to 10% by weight, in particular 3 to 8% by weight, of a latent cyanamide-based hardener, in particular dicyandiamide, and contains a remainder of water and in particular 4 to 20% by weight of a cosolvent, preferably 1-methoxy-propanol as the cosolvent.

An electric steel strip or sheet whose thermo-hardenable hot-melt adhesive varnish layer is dried can be particularly excellent. This is particularly expressed by an increase in the bonding strength and the peel resistance.

With regard to the above-mentioned advantages, a particularly excellent dried thermo-hardenable hot-melt adhesive varnish layer is one which contains:

75 to 92.8% by weight, in particular 80 to 90% by weight, of an epoxy resin or mixture of epoxy resins with an average molar mass of 1500 to 2000 g/mol, 4 to 24.8% by weight, in particular 7 to 12% by weight, of a hardener, in particular dicyanamide, and 0.2 to 4% by weight, in particular 0.4 to 2% by weight, of triamine as a pre-cross-linking agent with an average molar mass of 350 to 550 g/mol.

Another object of the invention is to provide a method for producing a lamination stack from an electrical steel strip or sheet, which is easy to carry out and enables a particularly reliable gluing—without having to fear a leakage of the hot-melt adhesive varnish during the integral bonding.

From a process standpoint, the production of an electric steel strip or sheet that is coated according to the invention can take place through application, in particular roller application or spray application, of the thermo-hardenable, water-based hot-melt adhesive varnish onto at least one flat side of the electrical steel strip or sheet.

To this end, the hot-melt adhesive varnish layer of the electric steel strip or sheet that is coated according to the invention is dried, particularly at a strip temperature of 180 to 280° C., sheet metal parts are cut from the electric steel strip or sheet, the sheet metal parts are stacked to form a lamination stack, and the lamination stack is glued, in particular by means of thermal activation, preferably at 100° C. to 250° C., of the hot-melt adhesive varnish layer.

It has turned out that due to the pre-cross-linking according to the invention, not only is there no negative impact on the adhesive strength and adhesiveness of the thermo-hardenable hot-melt adhesive varnish layer, but also the melt viscosity is increased to such a degree that an unwanted leakage thereof is avoided. Even in the process of the heating, i.e. during the heat-up phase, a controlled final cross-linking and a controlled hardening can be achieved.

Because of the simple and reliable production, lamination stacks that are obtained using the above-mentioned method are not only inexpensive, but also feature particularly high strength and outstanding magnetic properties.

The lamination stacks that are made of an electric steel strip or sheet and whose thermo-hardenable hot-melt adhesive varnish layer is dried and hardened using a method described herein can be particularly excellent.

BRIEF DESCRIPTION OF THE DRAWING

The FIGURE is a graph that shows a comparison of the peel resistance for Samples 1-3.

WAYS TO IMPLEMENT THE INVENTION

The invention will be explained by way of example below based on an embodiment variant.

Exemplary Embodiment 1

The relation for achieving an optimal pre-cross-linking that is improved according to the invention can among other things enable a particularly advantageous balancing of storage stability, ease of use, and leakproofness of the hot-melt adhesive varnish layer. The greater the value of X is, the lower the mass of the pre-cross-linking agent is in relation to the epoxy resin or mixture of epoxy resins. Excessively low values of X—and thus in the relation an excessively high percentage by weight of the pre-cross-linking agent—can result in lower storage stability because of the risk that a hot-melt adhesive varnish could already gel before use, which would simply make it more difficult to apply the hot-melt adhesive varnish. Excessively high values of X—and thus in the relation an excessively low percentage by weight of the pre-cross-linking agent—can among other things result in an excessively low degree of pre-cross-linking being achieved and in the hot-melt adhesive varnish having an excessively low viscosity and therefore being no longer leakage-stable.

In a preferred exemplary embodiment 1, an electric steel strip or sheet is coated with a thermo-hardenable, water-based hot-melt adhesive varnish layer, 100 grams of which hot-melt adhesive varnish layer contains:
  50 grams of an epoxy resin with an average molar mass of 2000 g/mol,
  5.0 grams of dicyandiamide as a latent hardener,
  1.0 grams of triamine as a pre-cross-linking agent with an average molar mass of 440 g/mol, namely a polyoxypropylene triamine of the following structural formula with three primary amino groups, which are bonded to secondary carbon atoms of terminal ether groups,

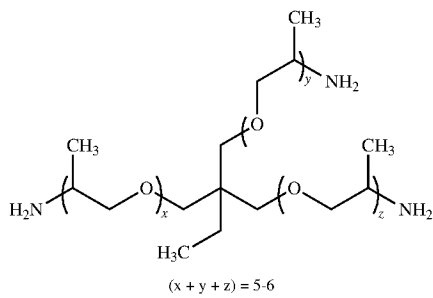

(x + y + z) = 5-6

10 grams of 1-methoxy-propanol as a copolymer, and
  a remainder of water.
Other additives and/or adjuvants are also conceivable.

In addition, the percentages by weight of the pre-cross-linking agent and the epoxy resin or mixture of epoxy resins in the thermo-hardenable hot-melt adhesive varnish layer satisfy the relation:

Percentage by weight of pre-cross-linking agent =

$$\frac{\text{Percentage by weight of the epoxy resin or mixture of epoxy resins}}{\text{average } M \text{ of the epoxy resin or mixture of epoxy resins}} *$$

$$\frac{\text{average } M \text{ of the pre-cross-linking agent}}{X * \text{average number of amino groups of the pre-cross-linking agent molecules}}$$

where M stands for molar mass. In exemplary embodiment 1, X turns out to have the value 3.67—which value also falls within the particularly preferably claimed range of 2.9 to 7.2.

Conventional layer thicknesses for steel strips have a thickness of 4 µm to 16 µm for the wet varnish; this is equivalent to approximately 2 µm to 8 µm in the dried state. For example, approximately 10 g/m²/strip side corresponds to a layer thickness of 5 µm in the dried state (i.e. approximately 10 µm of wet varnish thickness).

This composition can be used to adjust a particular state of the hot-melt adhesive varnish layer. The primary amino groups of the triamine react—at least at room temperature—with reactive epoxy groups of the epoxy resin to form secondary and tertiary amines. This therefore yields comparatively voluminous compounds in the thermo-hardenable, water-based hot-melt adhesive varnish layer and results in an increase in the molar mass.

The ratio of amino groups and epoxy groups according to the invention is also ideal for achieving a degree of pre-cross-linking that is ample enough to not cause a gelling of the water-based hot-melt adhesive varnish layer.

A hot-melt adhesive varnish of this kind has a high storage stability at room temperature without negatively affecting its properties with regard to adhesiveness and adhesive strength relative to the electric steel strip or sheet. For example, it can easily achieve a shelf life of 6 months. The water-based, thermo-hardenable hot-melt adhesive varnish layer is therefore easy to use.

The pre-cross-linking agent of the exemplary embodiment 1 exhibits another advantageous property, namely a steric hindrance at the carbon atom that carries the amino group. This results in the fact that the amino group of the polyether triamine is bonded to a secondary carbon atom of a terminal ether group. This influences the reactivity of the amino group. In particular, it reduces the tendency of a secondary amino group of the pre-cross-linking agent—i.e. an amino group that has already undergone a bonding with an epoxy resin molecule—to react with a second epoxy resin molecule to form a tertiary amino group. Thus not only can the degree of pre-cross-linking be adjusted with particular ease, but also the hot-melt adhesive varnish layer is also comparatively storage-stable. It can be stored at room temperature, even for a period of six months.

It has also surprisingly turned out that a particularly good adhesive strength of the hot-melt adhesive varnish layer according to the invention relative to an electric steel strip or sheet is achieved.

The hot-melt adhesive varnish layer according to the invention on the electric steel strip or sheet is dried at a strip temperature of 220° C.—as a result, water and the cosolvent, i.e. 1-methoxy-propanol, are driven out of the hot-melt adhesive varnish layer. After this process, the dried thermo-hardenable hot-melt adhesive varnish layer of exemplary embodiment 1 is composed of 89% by weight epoxy resin, 8.9% by weight dicyandiamide as a latent hardener, and 2.1% by weight triamine as a pre-cross-linking agent It must presumed that the amino groups of the pre-cross-linking agent each react with at least one epoxy group of different epoxy resin molecules of the epoxy resin.

According to the invention, an increased drying speed of the hot-melt adhesive varnish layer on the electric steel strip or sheet is observed. This dried thermo-hardenable hot-melt adhesive varnish layer also excels due to a high hardness with very good elasticity at the same time. The improved ductility is of particularly great significance—in combination with the outstanding adhesive strength of the dried thermo-hardenable hot-melt adhesive varnish layer relative to the electric steel strip or sheet, there are substantial improvements with regard to peel resistance.

As proof of the improvement in the peel resistance, the comparison results of 3 samples are shown.

Sample 1: Prior Art

The composition of the thermo-hardenable hot-melt adhesive varnish layer of sample 1 corresponds to a conventional commercially available baked varnish.

Sample 2: Prior Art

The composition of the thermo-hardenable hot-melt adhesive varnish layer from sample 2 corresponds to that of exemplary embodiment 1 (sample 3) according to the invention, but without the addition of the pre-cross-linking agent.

Sample 3: Exemplary Embodiment 1

The composition of the thermo-hardenable hot-melt adhesive varnish layer corresponds to that of exemplary embodiment 1 according to the invention. This was applied in a layer thickness of 5 μm onto a silicon-alloyed (approx. 3% Si) electric steel strip using roller application and underwent a drying at a strip temperature (PMT—peak metal temperature) of 220° C.

The peel resistance was determined using the method specified in the standard EN 1464.

The FIGURE shows a clear increase in the peel resistance for sample 3.

A particular advantage according to the invention lies in the adjustability of the melt viscosity of the dried thermo-hardenable hot-melt adhesive varnish layer during hardening. This is achieved in particular because of the special pre-cross-linking by means of the relation according to the invention of the percentage by weight of the pre-cross-linking agent and the epoxy resin in the thermo-hardenable hot-melt adhesive varnish layer. It is thus possible to reduce the risk of leakage of hot-melt adhesive varnish during the baking process of electric steel strips or sheets coated with hot-melt adhesive varnish according to the invention or the baking of sheet metal parts produced therefrom.

This is possible without a disadvantageous influence with regard to the stability and dispersion and with regard to the use of the hot-melt adhesive varnish, e.g. during application of the hot-melt adhesive varnish layer. Among other things, this is surprising because—despite an additional hardener that is also latent at room temperature—with the aid of a pre-cross-linking agent, which bonds to resin at room temperature, a high storage stability at room temperature is nevertheless assured and with regard to the further use, there are also no negative effects due to the drying of the thermo-hardenable hot-melt adhesive varnish layer on the electric steel strip or sheet.

Even percentages by weight of the pre-cross-linking agent that are slightly increased—relative to the limits according to the invention—not only result in a massive reduction in the storage stability of the thermo-hardenable, water-based hot-melt adhesive varnish, but also increase the melt viscosity of the dried thermo-hardenable hot-melt adhesive varnish layer on the electric steel strip or sheet to a degree that decreases its adhesion strength to an unacceptable degree.

The invention claimed is:

1. An electrical steel strip or sheet comprising:
at least one thermo-hardenable, water-based hot-melt adhesive varnish layer provided on one flat side of the electrical steel strip or sheet, wherein the at least one thermo-hardenable, water-based hot-melt adhesive varnish layer comprises an epoxy resin or a mixture of epoxy resins, at least one hardener, and a pre-cross-linking agent that bonds with the epoxy resin or with the mixture of epoxy resins, and wherein the pre-cross-linking agent is an organic triamine, and wherein percentages by weight of the pre-cross-linking agent and the epoxy resin or mixture of epoxy resins in the thermo-hardenable, water-based hot-melt adhesive varnish layer satisfy the following relation:

$$\text{Percentage by weight of pre-cross-linking agent} = \frac{\text{Percentage by weight of the epoxy resin or mixture of epoxy resins}}{\text{average } M \text{ of the epoxy resin or mixture of epoxy resins}} * \frac{\text{average } M \text{ of the pre-cross-linking agent}}{X * \text{average number of amino groups of the pre-cross-linking agent molecules}}$$

where
X stands for a number from 1.6 to 28.9, and
M stands for molar mass;
wherein the thermo-hardenable, water-based hot-melt adhesive varnish layer contains:
35 to 55% by weight of the epoxy resin or mixture of epoxy resins with an average molar mass of 1500 to 2000 g/mol;
2 to 10% by weight of the hardener; and
0.1 to 2% by weight of the organic triamine as the pre-cross-linking agent with an average molar mass of 350 to 550 g/mol, and
wherein, when the thermo-hardenable, water-based hot-melt adhesive varnish layer is dried, the dried thermo-hardenable, water-based hot-melt adhesive varnish layer contains:
75 to 92.8% by weight of the epoxy resin or mixture of epoxy resins with an average molar mass of 1500 to 2000 g/mol,
4 to 24.8% by weight of the hardener, and
0.2 to 4% by weight of the organic triamine as the pre-cross-linking agent with an average molar mass of 350 to 550 g/mol.

2. The electrical steel strip or sheet according to claim 1, wherein the three amino groups of the pre-cross-linking agent are each primary amino groups.

3. The electrical steel strip or sheet according to claim 1, wherein the pre-cross-linking agent is a polyether triamine.

4. The electrical steel strip or sheet according to claim 3, wherein at least one amino group of the polyether triamine is bonded to secondary carbon atoms of terminal ether groups.

5. The electrical steel strip or sheet according to claim 1, wherein the epoxy resin or the mixture of epoxy resins is bisphenol A-based.

6. The electrical steel strip or sheet according to claim 1, wherein the thermo-hardenable, water-based hot-melt adhesive varnish layer has a cyanamide-based hardener that is latent at room temperature.

7. The electrical steel strip or sheet according to claim 1, wherein the
hardener is a latent cyanamide-based hardener.

8. The electrical steel strip or sheet according to claim 7, wherein the thermo-hardenable, water-based hot-melt adhesive varnish layer contains a remainder of water and 4 to 20% by weight of a cosolvent.

9. The electrical steel strip or sheet according to claim 8, wherein the cosolvent is 1-methoxy-propanol.

10. A method for producing the electrical steel strip or sheet according to claim 1, comprising using a roller application or spray application of a thermo-hardenable, water-based hot-melt adhesive varnish onto the at least one flat side of the electrical steel strip or sheet.

11. A method for producing a lamination stack with the electrical steel strip or sheet according to claim 1, comprising:
   using a roller application or spray application of a thermo-hardenable, water-based hot-melt adhesive varnish onto the at least one flat side of the electrical steel strip or sheet to form the thermo-hardenable, water-based hot-melt adhesive varnish layer,
   drying the thermo-hardenable, water-based hot-melt adhesive varnish layer at a strip temperature of 180 to 280° C.,
   cutting sheet-metal parts from the electrical steel strip or sheet,
   stacking the sheet-metal parts to form the lamination stack,
   gluing the lamination stack through thermal activation of the dried thermo-hardenable, water based hot-melt adhesive varnish layer.

12. A lamination stack comprising the electrical steel strip or sheet according to claim 1, wherein the thermo-hardenable, water-based hot-melt adhesive varnish layer is dried and wherein the electrical steel strip or sheet is cut to form sheet-metal parts, and the sheet-metal parts are stacked and glued together with the thermo-hardenable, water-based hot-melt adhesive varnish layer to form the lamination stack.

13. The electrical steel strip or sheet according to claim 1, wherein the pre-cross-linking agent is a mixture of organic triamines.

14. The electrical steel strip or sheet according to claim 1, wherein the pre-cross-linking agent is a polyoxypropylene triamine.

15. The electrical steel strip or sheet according to claim 1, wherein the thermo-hardenable, water-based hot-melt adhesive varnish layer has a cyanamide-based hardener that consists of dicyandiamide.

16. The electrical steel strip or sheet according to claim 1, wherein X stands for a number from 2.1 to 19.4.

17. The electrical steel strip or sheet according to claim 1, wherein X stands for a number from 2.9 to 7.2.

18. The electrical steel strip or sheet according to claim 1, wherein the thermo-hardenable, water-based hot-melt adhesive varnish layer contains:
   40 to 50% by weight of the epoxy resin or mixture of epoxy resins with an average molar mass of 1500 to 2000 g/mol; and/or
   0.2 to 1% by weight of the organic triamine as the pre-cross-linking agent with an average molar mass of 350 to 550 g/mol.

19. The electrical steel strip or sheet according to claim 1, wherein the dried thermo-hardenable, water-based hot-melt adhesive varnish layer contains:
   80 to 90% by weight of the epoxy resin or mixture of epoxy resins with an average molar mass of 1500 to 2000 g/mol, and/or
   7 to 12% by weight of the hardener, and/or
   0.4 to 2% by weight of the organic triamine as the pre-cross-linking agent with an average molar mass of 350 to 550 g/mol.

20. The electrical steel strip or sheet according to claim 1, comprising a plurality of the electrical steel strips or sheets stacked and adhered together with the at least one thermo-hardenable, water-based hot-melt adhesive varnish layer to form a lamination stack.

21. The electrical steel strip or sheet according to claim 20, wherein the plurality of the electrical steel strips or sheets are in the form of sheet-metal parts.

* * * * *